(12) United States Patent
Lee et al.

(10) Patent No.: US 7,076,379 B2
(45) Date of Patent: Jul. 11, 2006

(54) METHOD OF ESTIMATING DOPPLER FREQUENCY SHIFT AND METHOD OF TRANSMITTING DATA USING THE SAME

(75) Inventors: Young Jo Lee, Kunpo-shi (KR); Ki Jun Kim, Seoul (KR); Young Cho Kim, Kunpo-shi (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/329,407

(22) Filed: Dec. 27, 2002

(65) Prior Publication Data

US 2004/0015308 A1     Jan. 22, 2004

(30) Foreign Application Priority Data

Dec. 29, 2001   (KR) ............................... 2001-88487

(51) Int. Cl.
*G06F 19/00*     (2006.01)
(52) U.S. Cl. ................ 702/75; 370/342; 375/142; 375/346
(58) Field of Classification Search ............. 702/66, 702/70, 71, 74, 190, 75, 76; 375/142, 224, 375/260, 346; 455/266, 441, 506, 431, 516; 370/50, 335, 342
See application file for complete search history.

(56) References Cited

U.S. PATENT DOCUMENTS

| | | | | |
|---|---|---|---|---|
| 5,212,804 A | * | 5/1993 | Choate | 455/431 |
| 5,455,964 A | * | 10/1995 | Roos et al. | 455/516 |
| 5,659,573 A | * | 8/1997 | Bruckert et al. | 375/142 |
| 6,034,952 A | * | 3/2000 | Dohi et al. | 370/335 |
| 6,219,391 B1 | * | 4/2001 | Nakano | 375/346 |
| 6,246,732 B1 | * | 6/2001 | Kobayashi et al. | 375/346 |
| 6,424,678 B1 | * | 7/2002 | Doberstein et al. | 375/260 |
| 6,449,489 B1 | * | 9/2002 | Lu et al. | 455/506 |
| 6,507,602 B1 | * | 1/2003 | Dent | 375/142 |
| 6,542,745 B1 | * | 4/2003 | Mottier et al. | 455/441 |
| 6,680,969 B1 | * | 1/2004 | Molnar et al. | 375/224 |
| 6,785,351 B1 | * | 8/2004 | Qiu | 375/346 |
| 2001/0002905 A1 | * | 6/2001 | Funamori | 370/342 |
| 2003/0087620 A1 | * | 5/2003 | Sendonais | 455/266 |

* cited by examiner

*Primary Examiner*—John Barlow
*Assistant Examiner*—John Le
(74) *Attorney, Agent, or Firm*—Fleshner & Kim, LLP

(57) ABSTRACT

Disclosed are a method of estimating a Doppler frequency shift and a method of transmitting data using the same. The method of estimating the Doppler frequency shift includes the steps of calculating difference values of a received pilot signal between i-th slot and (i−1)-th slot, for i=1, 2, ..., N; and estimating a Doppler frequency shift based on the difference values.

19 Claims, 4 Drawing Sheets

Pi-1>Ei-1, Pi<Ei    Pi-1<Ei-1, Pi>Ei

METHOD OF ESTIMATING DOPPLER FREQUENCY SHIFT AND METHOD OF TRANSMITTING DATA USING THE SAME

This application claims the benefit of the Korean Application No. P2001-88487 filed on Dec. 29, 2001, which is hereby incorporated by reference.

BACKGROUND OF THE INVENTION

1. Field of the Invention

The present invention relates to a mobile communication system, and more particularly, to a method of estimating a Doppler frequency shift and a method of transmitting data using the same.

2. Background of the Related Art

Typically, if a moving transmitting end transmits a radio wave to a receiving end, the frequency of the radio wave received by the receiving end has a different range from that of the frequency when the radio wave is transmitted. This is called a Doppler frequency shift phenomenon.

At this time, two essential elements that determine the degree of the Doppler frequency shift are a frequency that the transmitting end uses, and a moving speed of a moving receiving end. The used frequency and moving speed are in direct proportion to the Doppler frequency shift. That is, as the used frequency becomes higher and the moving speed becomes higher, the Doppler frequency shift appears greater.

However, since the used frequency is not changed in the general mobile communication system, the degree of the Doppler frequency shift is changed simply in accordance with the moving speed of the receiving end.

The Doppler frequency shift may be construed as the occurrence of the difference between the frequency range used to transmit a signal and frequency range in receiving the signal, and thus a great Doppler frequency shift means that there is a great difference between the transmission frequency and the receiving frequency. Also, the great Doppler frequency shift means that the moving speed of a terminal to receive the signal is higher than as usual on condition that the transmission frequency is unchanged.

In other words, the higher moving-speed of the terminal indirectly indicates that the channel communication environment is not good, e.g., a communication condition of a channel is rapidly changed.

The channel communication environment rapidly changed is directed to an unstable state, and this unstable state means that it is difficult to satisfy a desired quality level of the received data. This is because it is difficult to compensate for and obtain the quality of the desired level through the conventional power control technique with respect to a change of the channel communication environment having a greater level than a specified level.

However, the conventional communication system does not adopt a transmission method based on a Doppler frequency shift value according to a moving speed of a terminal to receive a transmission signal.

SUMMARY OF THE INVENTION

An object of the present invention is directed to a method of measuring a Doppler frequency shift that substantially obviates one or more problems due to limitations and disadvantages of the related art.

Another object of the present invention is to provide a method of measuring a Doppler frequency shift.

Still another object of the present invention is to provide a method of transmitting/receiving data using the Doppler frequency shift.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of estimating a Doppler frequency shift, comprises the steps of calculating difference values of a received pilot signal between i-th slot and (i−1)-th slot, for i=1, 2, . . . , N and estimating the Doppler frequency shift based on the difference values Preferably, the estimating method further includes the step of calculating the average receiving power by averaging the difference values.

Preferably, the estimating method further includes the step of tabling average receiving powers or scopes of the average receiving powers to reference Doppler frequency shifts.

According to another aspect of the present invention, a method of estimating a Doppler frequency shift, comprises the steps of calculating a receiving pilot signal power for each slot and an average receiving pilot signal power for N slots and estimating the Doppler frequency shift based upon a correlation of the receiving pilot signal powers and the average receiving pilot power.

Preferably, the estimating method further includes the step of obtaining the correlation by averaging a number of points crossing first slopes for each change of the receiving power between i-th slot and and (i−1) slot and second slopes for each change of the average power slope during previous slots including i-th slot.

Preferably, the obtaining method further includes the step of calculating slopes for each change of the receiving power between the i-th slot and the (i−1)-th slot, and calculating the average receiving power during previous N slots including i-th slot.

Preferably, the estimating method further includes the step of tabling averaged crossing point numbers or scopes of the averaged crossing-point numbers to reference Doppler frequency shifts.

According to another aspect of the present invention, a method of transmitting data, comprises the steps of estimating a Doppler frequency shift using a pilot channel signal, and adjusting a data rate by controlling one of data amount and data slot length based on the Doppler frequency shift.

Preferably, the adjusting method further includes the step of decreasing the data rate if the Doppler frequency shift is greater than a threshold value, and increasing the data rate if the Doppler frequency shift is less than the threshold value.

Preferably, a transmission power is constant for the decreased or increased data rate.

Preferably, for the increased or decreased data rate, the data slot length is fixed and the data amount varies.

Preferably, a data throughput is increased by increasing the data amount for the increased or decreased data rate.

Preferably, for the increased or decreased data rate, the data slot length varies and the data amount is fixed.

Preferably, a receiving energy is increased by increasing the data slot length for the decreased data rate.

Preferably, an interleaving ratio is increased by increasing the data slot length for the decreased data rate.

Preferably, the estimating method further includes the steps of calculating difference values of a received pilot signal between i-th slot and (i−1)-th slot, for i=1, 2, ..., N, and estimating the Doppler frequency shift based on the difference values.

Preferably, the estimating method further includes the step of estimating the Doppler frequency shift by averaging a number of points crossing first slopes for each change of the receiving power between i-th slot and and (i−1) slot and second slopes for each change of the average power slope during previous slots including i-th slot.

According to still another aspect of the present invention, a method of transmitting data, comprises the steps of estimating a Doppler frequency shift, and adjusting a data rate by controlling a gating rate based on the Doppler frequency shift.

Preferably, the adjusting method further includes the steps of decreasing the data rate if the reported Doppler frequency shift is greater than a threshold value, and increasing the data rate if the reported Doppler frequency shift is less than the threshold value.

Preferably, a transmission power is constant for the decreased or increased data rate.

Preferably, the estimating method further includes the step of calculating difference values of a received pilot signal between i-th slot and (i−1)-th slot, for i=1, 2, ..., N, and estimating the Doppler frequency shift based on the difference values.

Preferably, the estimating method further includes the step of estimating he Doppler frequency shift by averaging a number of points crossing first slopes for each change of the receiving power between i-th slot and and (i−1) slot and second slopes for each change of the average power slope during previous slots including i-th slot.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

In the present invention, a method of increasing the received energy and/or a method of obtaining an interleaving effect by extending the data transmission time according to a moving speed of a terminal, e.g., according to the Doppler frequency shift value are suggested.

In the present invention, the following situations are considered. For example, it is assumed that the receiving end receives a signal having a sufficient receiving energy irrespective of the degree of the Doppler frequency shift, and thus there is no problem in receiving the signal at the receiving end. Also, it is assumed that the receiving end has any feedback channel that informs the transmitting end of the channel environment in receiving the signal.

Figure 1:
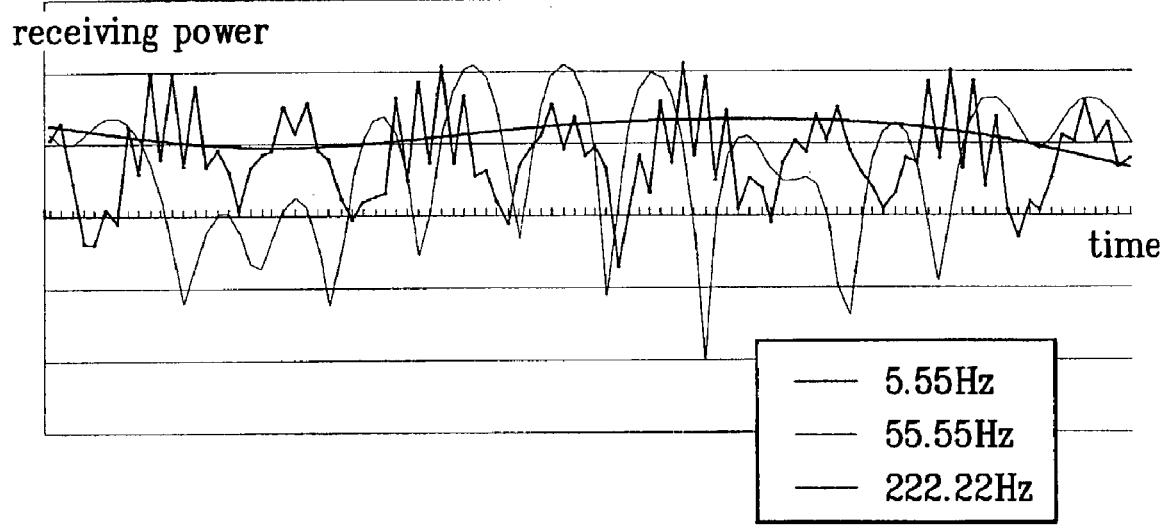
FIG. 1 is a graph illustrating the receiving power of the channel according to the Doppler frequency shift.

Generally, a feedback channel for informing a channel environment are transmitted at predetermined intervals. However, if the receiving end estimates the Doppler frequency shift and then informs the transmitting end of the channel environment based on the estimated Doppler frequency shift, the intervals of transmission of the feedback channel is not required to be constant. In case that the channel environment is rapidly changed, the number of transmitting the feedback channel should be high, but in case that the channel communication environment is slowly changed, it is not necessary that the number of transmitting the feedback channel is high. Accordingly, if the degree of the Doppler frequency shift is estimated, it may be recognized whether the channel communication environment is changed rapidly or slowly, and thus the receiving end may adjust the number of transmitting the feedback channel informing the transmitting end the channel environment to match the degree of a change of the channel communication environment. If the receiving end finds out the Doppler frequency shift and reports the channel communication environment based on the Doppler frequency shift to the transmitting, it is possible for the transmitting end to efficiently transmit data with the waste of the transmission power reduced. FIG. 1 is a graph illustrating the receiving power of the channel according to the Doppler frequency shift.

Referring to FIG. 1, it may be seen that as the Doppler frequency shift value is lower, the channel environment is slowly changed. However, it may be seen that as the Doppler frequency shift value is higher, the channel environment is rapidly changed. Accordingly, the present invention suggests two methods for estimating the Doppler frequency shift accurately, quantitatively, and statistically because a degree of the Doppler frequency shift varies according to a degree of a change of the channel communication environment. The two method of estimating the Doppler frequency shift uses a receiving power of the pilot signal, wherein it is assumed that the transmission power of the pilot signal is unchanged.

Figure 2:
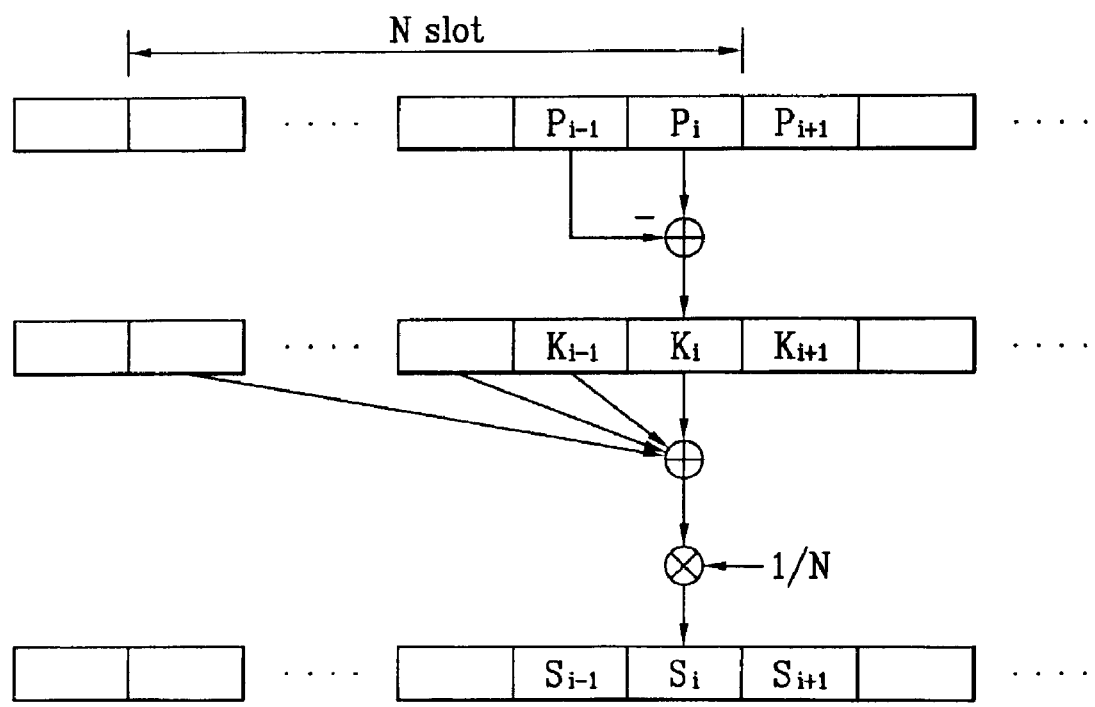
FIG. 2 is a diagram illustrating a slope measuring procedure according to the method of estimating the Doppler frequency shift according to a preferred embodiment of the present invention.

FIG. 2 is a diagram illustrating a slope measuring procedure according to the method of estimating the Doppler frequency shift according to a preferred embodiment of the present invention.

In FIG. 1, it may be seen that as the degree of the Doppler frequency shift is heightened, the degree of a change of the channel environment is increased. The degree of the channel environment change may be expressed as the steepness of the slope of a straight line connecting specified sections. Actually, it may be recognized by estimating the slope between the specified sections with respect to the degree of the respective Doppler frequency shift that there exists a constant slope value in average according to the degree of the Doppler frequency shift.

Generally, as the degree of the Doppler frequency shift becomes larger, the slope becomes greater. Accordingly, the degree of the slope of the receiving power for each specified section may be obtained, and thus the degree of the Doppler frequency shift may be estimated inversely.

As shown in FIG. 2, the receiving end first measures the receiving power of a received pilot channel by each transmission unit of the transmitting end (e.g., per slot). At this time, if it is assumed that the receiving power during the i-th slot of the pilot signal is $P_i$ and the receiving power during the (i−1)-th slot of the pilot signal is $P_{i-1}$, the slope of the change of the receiving power of the received pilot channel is expressed as the following equation 1.

$$Ki=|P_i-P_{i-1}|, \text{ for } i=0,1,\ldots,N-1 \quad \text{[Equation 1]}$$

The average $S_i$ of a plurality of slopes $K_i$ obtained for N slots by using the equation 1. The calculated value $S_i$ is expressed as the following equation 2.

$$S_i = \frac{1}{N} \sum_{j=i-N+1}^{i} k_j, \text{ for } i = 0, 1, \ldots, N-1 \quad \text{[Equation 2]}$$

The average value $S_i$ of the slopes obtained as above is mapped with the reference Doppler frequency shift value corresponding to the average value $S_i$ or to within the scope of the average value $S_i$, wherein the reference Doppler frequency shift value to the average value or the average value scope is pre-tabled through a field test or simulation, and thus the actual value of the Doppler frequency shift may be obtained.

Figure 3:
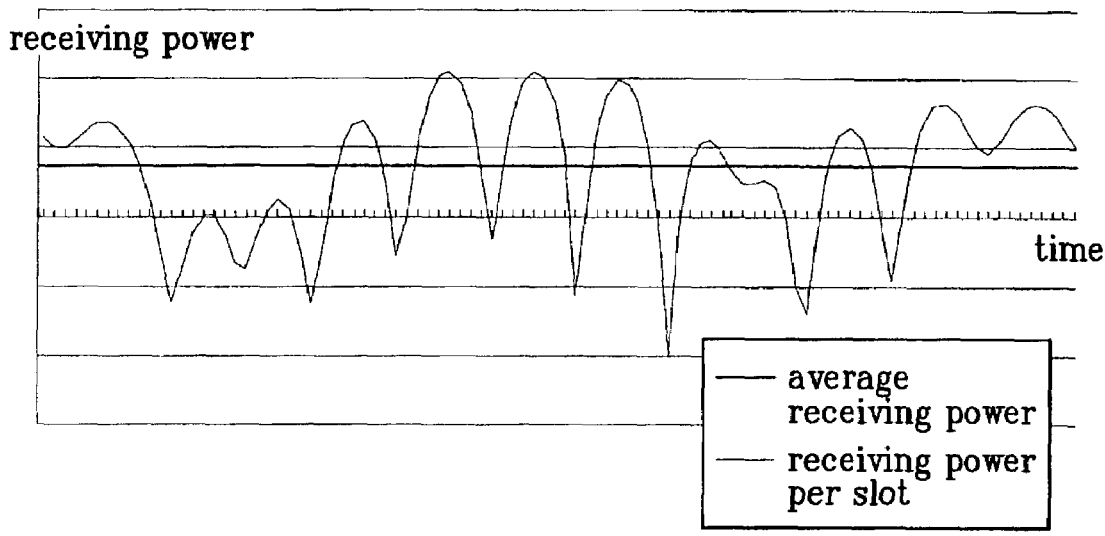
FIG. 3 is a graph illustrating the receiving power per slot and the average receiving power in a specified Doppler frequency shift.

FIG. 3 is a graph illustrating the receiving power per slot and the average receiving power in a specified Doppler frequency shift.

Figure 4:
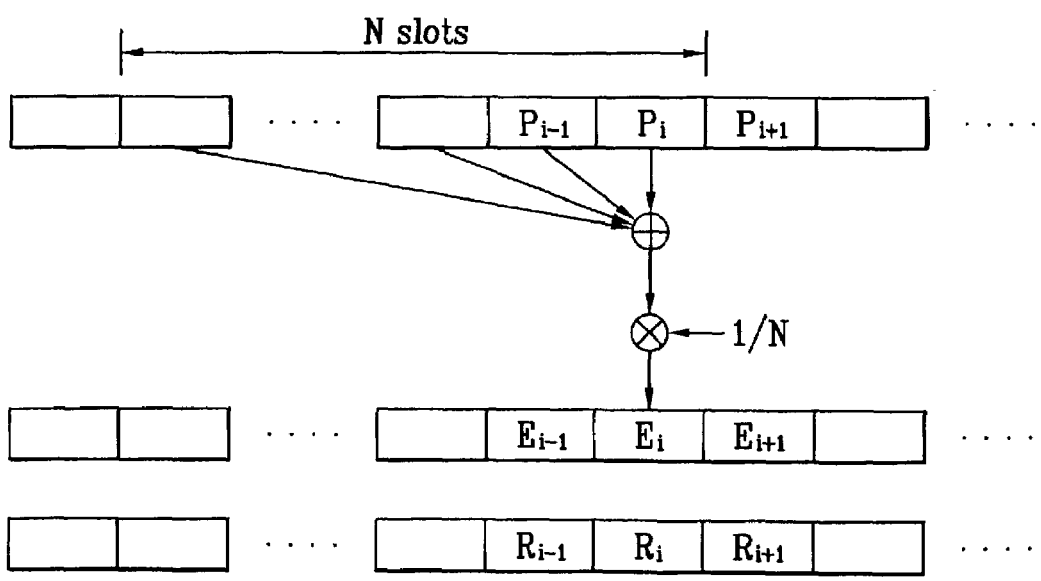
FIG. 4 is a diagram illustrating a procedure of measuring a crossing rate of a receiving power over an average receiving power according to the method of estimating the Doppler frequency shift according to another preferred embodiment of the present invention.

FIG. 4 is a diagram illustrating a procedure of measuring a crossing rate of a receiving power over an average receiving power according to the method of estimating the Doppler frequency shift according to another preferred embodiment of the present invention.

Unlike the method of measuring the slope of FIG. 2, the method of FIG. 4 obtains the average receiving power for N slots, and measures how frequently the receiving power per slot crosses the average receiving power.

FIG. 3 shows the receiving power per slot and the average receiving power in case that the Doppler frequency shift is 55.55 Hz. In FIG. 3, there are points where the receiving power per slot crosses the average receiving power, and there is a tendency that as the Doppler frequency shift becomes greater, the number of the crossing points is increased in proportion to the Doppler frequency shift. Accordingly, the number of points where the receiving power per slot crosses the average receiving power for N slots is obtained, and then the corresponding crossing rate is obtained for the whole N-slot time. The present degree of the Doppler frequency shift may be obtained by comparing the obtained crossing rate with a pre-obtained crossing rate corresponding to a reference value of the Doppler frequency shift.

That is, as shown in FIG. 4, it is assumed that the receiving power during the i-th slot of the pilot signal is $P_i$. At this time, the average receiving power $E_i$ during the previous N slots including the i-th slot on the pilot signal may be defined as the following equation 3.

$$E_i = \frac{1}{N} \sum_{j=i-N+1}^{i} P_j, \text{ for } i = 0, 1, \ldots, N-1 \quad \text{[Equation 3]}$$

Figure 5:
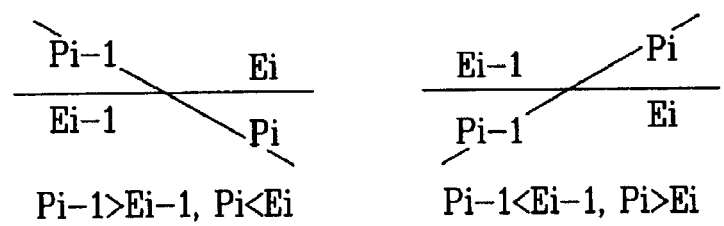
FIG. 5 is a diagram illustrating a crossing point generating process used in the present invention.

Referring to FIG. 5, it may be assumed that the receiving power $P_{i-1}$ is larger than the average receiving power $E_{i-1}$ during the (i−1)-th slot of the pilot signal. If the receiving power $P_i$ of the i-th slot of the pilot signal is smaller than the average receiving power $E_i$, it is considered that the crossing occurs. Meanwhile, in case that $P_{i-1}<E_{i-1}$ and simultaneously $P_i>E_i$, the crossing also occurs.

At this time, if the number of crossings occurring for the whole N slots including the i-th slot as described above is $C_i$, the crossing rate $R_i$ is expressed as the following equation 4.

$$R_i = \frac{C_i}{N} \text{ for } i = 0, 1, \ldots, N-1 \quad \text{[Equation 4]}$$

The crossing rate value $R_i$ obtained by the equation 4 is mapped with a reference Doppler frequency shift corresponding to the crossing rate $R_i$ or to within the scope of the crossing rate $R_i$, wherein the reference Doppler frequency shift value to the crossing rate or the crossing rate scope is pre-tabled through a field test or simulation, and thus the present value of the Doppler frequency shift may be obtained.

In the present invention, if the Doppler frequency shift value is measured to be low, the data transmission rate is increased, on the contrary, if the Doppler frequency shift value is measured to be high, the data transmission rate is decreased. This is illustrated in FIG. 6.

Figure 6:
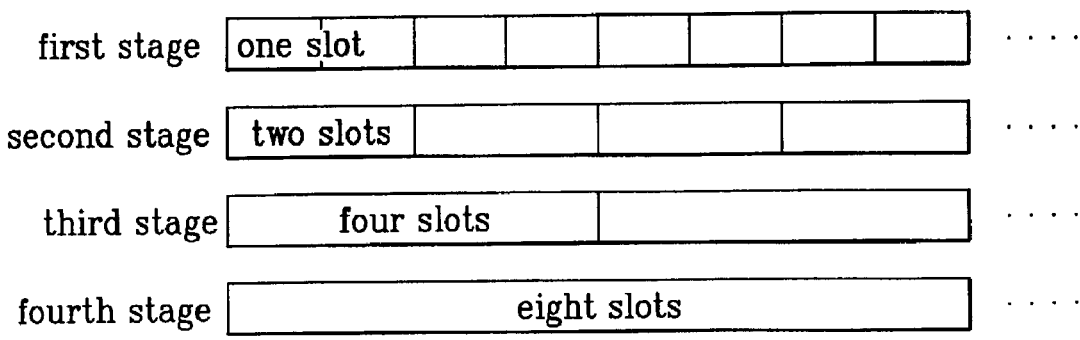
FIG. 6 is a diagram illustrating an example of data transmission using the Doppler frequency shift obtained by the measuring procedure of FIG. 2 or 4 according to the present invention.

FIG. 6 is a diagram illustrating an example of data transmission using the Doppler frequency shift obtained by the measuring procedure of FIG. 2 or 4 according to the present invention.

As described above, the Doppler frequency shift value is measured to be low, it indicates that the channel condition is very stable. In this case, if a proper power control method is applied, the communication quality of a desirable level may be obtained.

Accordingly, if the Doppler frequency shift value is estimated to be low, the receiving end may receive data with a desirable communication quality even though the transmitting end transmits the data with a high data transmission rate.

On the contrary, if the Doppler frequency shift value is estimated to be high, the channel environment is rapidly changed, and thus the communication quality of a proper level may not be guaranteed.

In this case, the transmitting end reduces the data transmission rate. At this time, if the data transmission rate is reduced on condition that an allocated transmission energy is unchanged, it leads to the increase of the transmission energy, and thus the receiving end may obtain an improved communication quality.

There are two methods of adjusting the data transmission rate. One is a method of reducing the data rate with the length of the slot to be transmitted fixed, and the other is a method of adjusting the length of the slot to be transmitted with the data rate fixed.

For instance, it may be considered that the degree of the Doppler frequency shift is classified into four stages.

The first stage corresponds to the lowest degree of the Doppler frequency shift, and the fourth stage corresponds to the highest degree of the Doppler frequency shift.

As shown in FIG. 6, it is assumed that there is a channel through which data is transmitted by allocating one slot at the first stage, two slots at the second stage, four slots at the third stage, and eight slots at the fourth stage, respectively.

In this case, if the bits of data to be transmitted are equal and the transmission powers are also equal, the receiving energies for two slots, four slots, and eight slots are increased two times, four times, and eight times the energy for one slot, respectively.

Also, as the length of the slot is increased, the interleaving effect becomes greater, and thus the probability of success in receiving data on the slots is increased. Accordingly, the transmitting end may obtain the effect of increasing the data throughput by increasing the data transmission rate if the transmitting end determines the receiving communication environment to be good (or stable) based on the Doppler frequency shift.

However, if the receiving communication environment determined not to be good (unstable), the transmitting end adjusts the length of the slot and/or the transmission power such that the receiving end may have an increased probability of success in receiving data. At this time, a coding type, interleaving type, modulation type, transmission power, etc., according to the adjusted length of the slot may be optimized according to the channel communication condition and a system used between transmitting end and receiving end.

Meanwhile, in case that a receiving error is produced at a desired level in spite of the channel environment where the Doppler frequency shift appears to be high since the channel does not have a large amount of data or has a sufficient transmission power, a method of using gating is proposed. This is illustrated in FIG. 7.

Figure 7:
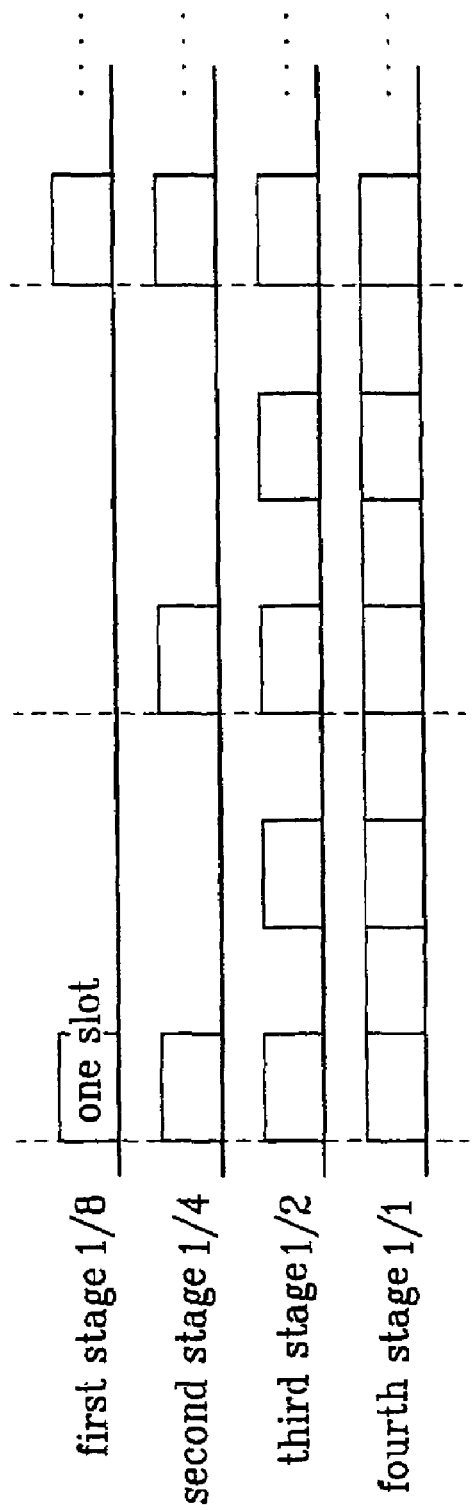
FIG. 7 is a diagram illustrating another example of data transmission using the Doppler frequency shift obtained by the measuring procedure of FIG. 2 or 4 according to the present invention.

FIG. 7 is a diagram illustrating another example of data transmission using the Doppler frequency shift obtained by the measuring procedure of FIG. 2 or 4 according to the present invention.

According to this method, the gating rate is lowered in case that the degree of the Doppler frequency shift is low, and the gating rate is heightened in case that the degree of the Doppler frequency shift is high.

In FIG. 7, it may be considered that the degree of the Doppler frequency shift is classified into four stages.

The first stage corresponds to the lowest degree of the Doppler frequency shift, and the fourth stage corresponds to the highest degree of the Doppler frequency shift. It may be considered that at the first to fourth stages, a ⅛ gating, ¼ gating, ½ gating and ¹⁄₁ gating are used, respectively.

Specifically, as shown in FIG. 7, at the first stage, only one slot among eight slots is transmitted, at the second stage, one slot among four slots is transmitted, and at the third stage, one slot between two slots is transmitted. At the fourth stage, the data is transmitted for each slot.

The gating method is useful on condition that the power, at which data may be transmitted, is sufficient because the amount of data to be transmitted is not large.

In addition, the gating method is suitable on condition that the receiving end periodically transmits a report message of the channel communication environment to the transmitting end.

Specifically, if the channel environment change is great, the data is transmitted with a high gating rate (for example, the rate of ¹⁄₁), while if the channel communication environment change is not great, the data is transmitted with a low gating rate (for example, the rate of ⅛).

As described above, the present invention has the following effects.

First, if the degree of the Doppler frequency shift is measured by using the received pilot signal, an accurate value of the Doppler frequency shift may be seized without employing additional equipment.

Second, by applying the proposed methods according to the seized degree of the Doppler frequency shift, the data may be transmitted with a high data transmission rate on condition that the channel communication environment is stable, and the stable and successful data reception is possible to increase the whole throughput even though in a state that the channel communication environment is not stable.

Third, the waste of the transmission power may be prevented through the gating method.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of estimating a Doppler frequency shift, comprising:

calculating a receiving pilot signal power for each slot and an average receiving pilot signal power from a first slot to an i-th slot for each slot; and estimating the Doppler frequency shift based upon a correlation of the receiving pilot signal powers and the average receiving pilot power, wherein the correlation is obtained by averaging a number of points crossing first slopes for each change of the receiving pilot signal power between the i-th slot and an (i−1)-th slot and second slopes for each change of the average receiving pilot signal power slope during previous slots, including the i-th slot.

2. The method of claim 1, further comprising:

calculating slopes for each change of the receiving pilot signal power between the i-th slot and the (i−1)-th slot; and calculating the average receiving pilot signal power during previous slots, including the i-th slot.

3. The method of claim 1, further comprising tabling the correlation to a predetermined Doppler frequency shift value based on a simulation.

4. A method of transmitting data, comprising:

estimating a Doppler frequency shift using a pilot signal in a receiver; and adjusting a data rate to be increased or decreased by controlling one of a data amount or a data slot length based on a comparison of the Doppler frequency shift reported by the receiver and a threshold, wherein adjusting the data rate comprise decreasing the data rate if the Doppler frequency shift is greater than the threshold, and increasing the data rate if the Doppler frequency shift is less than the threshold, and for the increased or decreased data rate, the data slot length is fixed and the data amount varies.

5. The method of claim 4, wherein a transmission power is constant for the decreased or increased data rate.

6. The method of claim 4, wherein a data throughput is increased by increasing the data amount for the increased or decreased data rate.

7. The method of claim 4, wherein the estimating is performed by calculating difference power values of a received pilot signal between an i-th slot and an (i−1)-th slot, for i1, 2, . . . , N.

8. The method of claim 4, wherein the estimating is performed by averaging a number of points crossing first slopes for each change of a receiving pilot signal power between an i-th slot and an (i−1)-th slot, and second slopes for each change of the average receiving pilot signal power slope during previous slots, including the i-th slot.

9. The method of claim 4, wherein the Doppler frequency shift indicates a channel condition.

10. A method of transmitting data, comprising:
estimating a Doppler frequency shift using a pilot signal in a receiver; and
adjusting a data rate to be increased or decreased by controlling one of a data amount or a data slot length based on a comparison of the Doppler frequency shift reported by the receiver and a threshold, wherein adjusting the data rate comprise decreasing the data rate if the Doppler frequency shift is greater than the threshold, and increasing the data rate if the Doppler frequency shift is less than the threshold, wherein for the increased or decreased data rate, the data slot length varies and the data amount is fixed.

11. The method of claim 10, wherein a receiving energy is increased by increasing the data slot length for the decreased data rate.

12. The method of claim 11, wherein an interleaving ratio is increased by increasing the data slot length for the decreased data rate.

13. The method of claim 10, wherein the Doppler frequency shift indicates a channel condition.

14. A method of transmitting data, comprising:
estimating a Doppler frequency shift in a receiver; and
adjusting a data rate to be increased or decreased by controlling a gating rate based on a comparison of the Doppler frequency shift reported by the receiver and a threshold values, wherein adjusting the data rate comprises:

decreasing the data rate if the Doppler frequency shift is greater than the threshold value, and
increasing the data rate if the Doppler frequency shift is less than the threshold value,
wherein a transmission power is constant for the decreased or increased data rate.

15. The method of claim 14, wherein estimating the Doppler frequency shift comprises calculating difference power values of a received pilot signal between an i-th slot and an (i−1)-th slot, for i1, 2, . . . , N.

16. The method of claim 14, wherein estimating the Doppler frequency shift comprises averaging a number of points crossing first slopes for each change of a receiving pilot signal power between an i-th slot and an (i−1)-th slot, and second slopes for each change of the average receiving pilot signal power slope during previous slots, including the i-th slot.

17. An apparatus for transmitting data, comprising:
means for receiving a Doppler frequency shift estimated by a receiver based on a pilot signal; and
adjusting means for adjusting a data rate to be increased or decreased by controlling one of a data amount, a data slot length, or a gating rate based on a comparison of a threshold value and the Doppler frequency shift, wherein the adjusting means comprises:
means for decreasing the data rate if the Doppler frequency shift is greater than the threshold value; and
means for increasing the data rate if the Doppler frequency shift is less than the threshold value,
wherein a transmission power is constant for the decreased or increased data rate.

18. The apparatus of claim 17, wherein the Doppler frequency shift is estimated by averaging a number of points crossing first slopes for each change of a receiving pilot signal power between an i-th slot and an (i-1)-th slot and second slopes for each change of the average receiving pilot signal power slope during previous slots, including the i-th slot.

19. A method comprising:
measuring a pilot signal power of each of slot of a plurality of slots;
calculating an average pilot signal power for said each slot; and
estimating a Doppler frequency shift based on a correlation of the measured pilot signal powers and the average pilot signal powers, wherein the correlation is obtained by a crossing rate indicating a crossing number that a first graph of the measured pilot signal powers crosses a second graph of the average received pilot powers in a predetermined time.

* * * * *